US012585287B2

(12) United States Patent (10) Patent No.: US 12,585,287 B2
Nishiyama et al. (45) Date of Patent: Mar. 24, 2026

(54) AUTONOMOUS TRAVELING DEVICE AND AUTONOMOUS TRAVELING DEVICE CONTROL METHOD

(71) Applicant: NIDEC DRIVE TECHNOLOGY CORPORATION, Kyoto (JP)

(72) Inventors: Jun Nishiyama, Kyoto (JP); Shohei Imada, Kyoto (JP); Tomoki Yoshikawa, Kyoto (JP)

(73) Assignee: NIDEC DRIVE TECHNOLOGY CORPORATION, Kyoto (JP)

( * ) Notice: Subject to any disclaimer, the term of this patent is extended or adjusted under 35 U.S.C. 154(b) by 63 days.

(21) Appl. No.: 18/696,362

(22) PCT Filed: Jun. 17, 2022

(86) PCT No.: PCT/JP2022/024259
§ 371 (c)(1),
(2) Date: Mar. 28, 2024

(87) PCT Pub. No.: WO2023/053602
PCT Pub. Date: Apr. 6, 2023

(65) Prior Publication Data
US 2024/0385624 A1 Nov. 21, 2024

(30) Foreign Application Priority Data
Sep. 29, 2021 (JP) ................................. 2021-159837

(51) Int. Cl.
*G05D 1/24* (2024.01)
*G05D 1/246* (2024.01)
(Continued)

(52) U.S. Cl.
CPC ........... *G05D 1/2464* (2024.01); *G05D 1/622* (2024.01); *G05D 1/639* (2024.01)

(58) Field of Classification Search
CPC ...... G05D 1/2464; G05D 1/622; G05D 1/639; G05D 2105/28; G05D 2107/70; G05D 2109/10; G09B 29/00
See application file for complete search history.

(56) References Cited

U.S. PATENT DOCUMENTS 5,109,566 A * 5/1992 Kobayashi .......... A47L 11/4011
15/340.1
6,300,737 B1 * 10/2001 Bergvall .............. A01D 34/008
318/587
(Continued)

FOREIGN PATENT DOCUMENTS

JP 2009-223812 A 10/2009
JP 2010-061293 A 3/2010
(Continued)

OTHER PUBLICATIONS

International Search Report in PCT/JP2022/024259, mailed Sep. 6, 2022, 5pp.

*Primary Examiner* — Tyler J Lee
(74) *Attorney, Agent, or Firm* — HAUPTMAN HAM, LLP

(57) ABSTRACT

One aspect of an autonomous traveling device includes: an information adding unit that adds, as positional information of a virtual obstacle, to map information, positional information of a virtual obstacle that passes through a rear side of the device with respect to a starting point of a travel route and continuously extends to a front side on both right and left sides of the device itself; and a route search unit that searches for a travel route based on the map information to which the positional information of the virtual obstacle is added.

7 Claims, 12 Drawing Sheets

(51) Int. Cl.
    *G05D 1/622*       (2024.01)
    *G05D 1/639*       (2024.01)

(56)            References Cited

U.S. PATENT DOCUMENTS

| | | | |
|---|---|---|---|
| 6,615,108 B1 * | 9/2003 | Peless | A01D 34/008 |
| | | | 700/262 |
| 6,690,134 B1 * | 2/2004 | Jones | A47L 9/009 |
| | | | 318/587 |
| 7,388,343 B2 * | 6/2008 | Jones | G05D 1/0227 |
| | | | 701/1 |
| 8,364,309 B1 * | 1/2013 | Bailey | G05D 1/0259 |
| | | | 700/245 |
| 10,444,764 B2 | 10/2019 | Nakano et al. | |
| 10,639,793 B2 | 5/2020 | Williams et al. | |
| 2003/0025472 A1 * | 2/2003 | Jones | G05D 1/0227 |
| | | | 318/568.17 |
| 2004/0204792 A1 * | 10/2004 | Taylor | A47L 9/2805 |
| | | | 700/245 |
| 2011/0167574 A1 * | 7/2011 | Stout | B25J 9/163 |
| | | | 701/25 |
| 2012/0265391 A1 * | 10/2012 | Letsky | G05D 1/0221 |
| | | | 701/25 |
| 2022/0355823 A1 | 11/2022 | Tagawa | |

FOREIGN PATENT DOCUMENTS

| | | |
|---|---|---|
| JP | 2015-057688 A | 3/2015 |
| WO | 2018116769 A1 | 6/2018 |

* cited by examiner

DISTANCE TO NEAREST OBSTACLE

AUTONOMOUS TRAVELING DEVICE AND AUTONOMOUS TRAVELING DEVICE CONTROL METHOD

CROSS-REFERENCE TO RELATED APPLICATIONS

This is the U.S. national stage of application No. PCT/JP2022/024259, filed on Jun. 17, 2022, and priority under 35 U.S.C. § 119(a) and 35 U.S.C. § 365(b) is claimed from Japanese Patent Application No. 2021-159837, filed on Sep. 29, 2021.

FIELD

The present invention relates to an autonomous traveling device and an autonomous traveling device control method.

BACKGROUND

Conventionally, there are autonomous traveling devices known to travel autonomously by searching for routes to destinations based on map information and the like. The map information includes information of obstacles and the like, and such an autonomous traveling device searches for and determines a travel route within a range where the device can go through.

For example, in Patent Literature 1, there is a proposal for a technology in which, in a self-driving vehicle, a virtual obstacle setting means sets a virtual obstacle on both sides of a traveling point of the vehicle itself based on the traveling direction of the vehicle itself acquired as travel information, and the virtual obstacle setting means generates a travel route that passes between the virtual obstacles set on both sides of the traveling point.

CITATION LIST

Patent Literature

Patent Literature 1: Japanese Patent Application Laid-open No. 2015-57688

SUMMARY

Technical Problem

Among autonomous traveling devices, AMR and the like have a function capable of rotating on the spot. Thus, when searching for a travel route, the travel route is determined in a direction that shortens the route length, regardless of the orientation of the device. However, even such autonomous traveling devices having the function of rotating on the spot, there are many autonomous traveling devices whose external shapes are not circular shape but rectangular shape and the like. Thus, if a travel route that leads to a narrow path with a width where rotation on the spot is difficult or heads backward at a place where an obstacle exists at a distance where rotation on the spot is difficult, the autonomous traveling devices cannot travel to the direction of the determined travel route and may fall into a state called stuck where autonomous traveling is not possible.

Therefore, it is an object of the present invention to avoid getting stuck on a narrow path or in the vicinity of an obstacle.

Solution to Problem

One aspect of an autonomous traveling device according to the present invention includes: an information adding unit that adds, as positional information of a virtual obstacle, to map information, positional information of a virtual obstacle that passes through a rear side of the device with respect to a starting point of a travel route and continuously extends to a front side on both right and left sides of the device; and a route search unit that searches for a travel route based on the map information to which the positional information of the virtual obstacle is added.

Furthermore, one aspect of an autonomous traveling device control method according to the present invention includes: an information adding step of adding, as positional information of a virtual obstacle, to map information, positional information of a virtual obstacle that passes through a rear side of the device with respect to a starting point of a travel route and continuously extends to a front side on both right and left sides of the device; and a route search step of searching for a travel route based on the map information to which the positional information of the virtual obstacle is added.

Advantageous Effects of Invention

According to the present invention, it is possible to avoid getting stuck on a narrow paths or in the vicinity of an obstacle.

DESCRIPTION OF EMBODIMENTS

Figure 1:
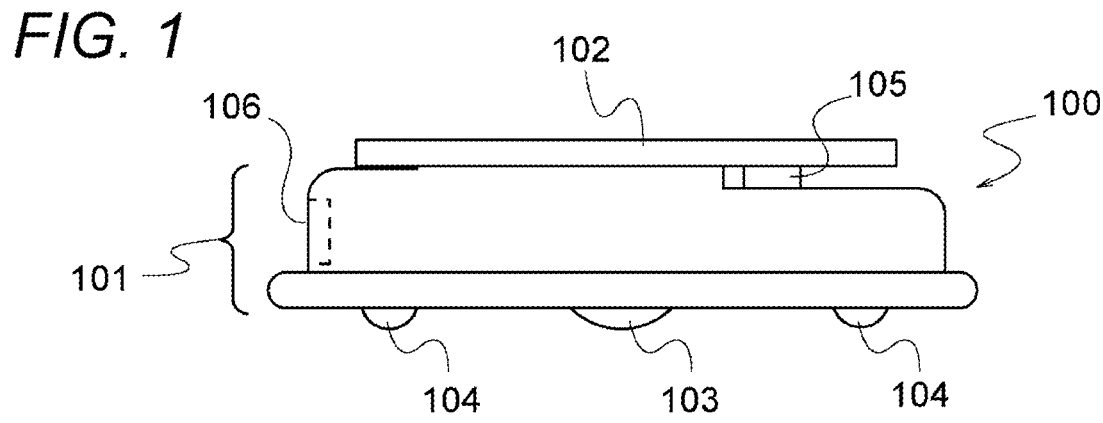
FIG. 1 is a side view illustrating an appearance of an autonomous traveling device according to an embodiment.

Hereinafter, an embodiment of an autonomous traveling device and an autonomous traveling device control method according to the present disclosure will be described in detail with reference to the accompanying drawings. However, in order to avoid unnecessary redundancy in the following description and to facilitate the understanding of those skilled in the art, more detailed explanations than necessary may be omitted. For example, detailed explanations of already well-known matters and duplicate explanations for substantially same configurations may be omitted. Furthermore, elements illustrated in the drawings described earlier may be referred to as appropriate in the explanations of latter drawings.

Figure 2:
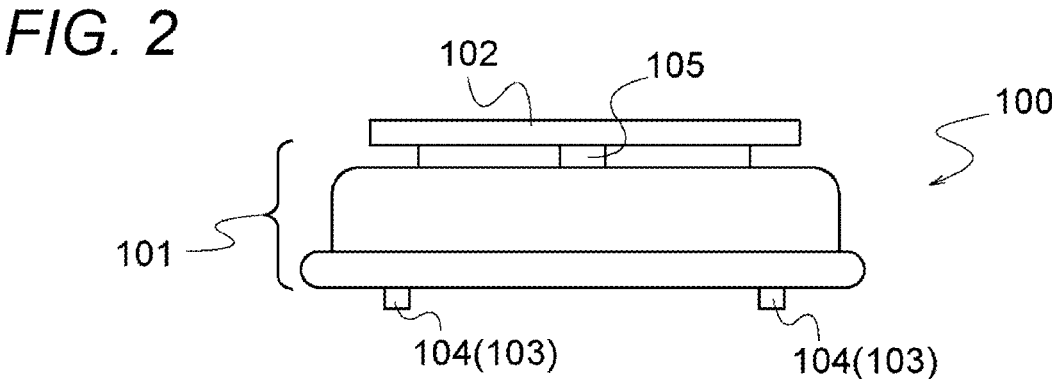
FIG. 2 is a front elevational view illustrating the appearance of the autonomous traveling device according to the present embodiment.
Figure 3:
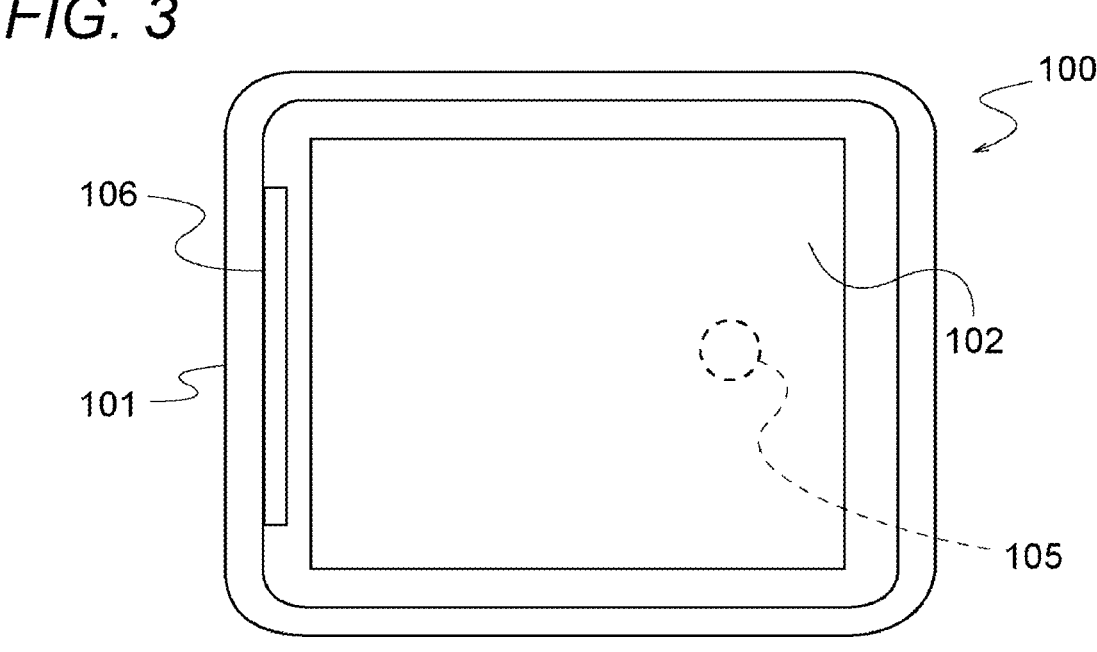
FIG. 3 is a top view illustrating the appearance of the autonomous traveling device according to the present embodiment.

FIG. 1 to FIG. 3 are diagrams illustrating the appearance of the autonomous traveling device according to the present embodiment. FIG. 1 illustrates a side view, FIG. 2 illustrates a front elevational view, and FIG. 3 illustrates a top view.

An autonomous traveling device 100 according to the present embodiment is a device called an autonomous mobile robot (AMR) that transports materials and the like in factories, public places, and the like, for example.

The autonomous traveling device 100 includes a body unit 101, a loading platform 102, wheels 103, casters 104, a front sensor 105, and a rear sensor 106.

The body unit 101 has a computer for control, a power supply for driving, and the like built therein. The shape of the body unit 101 viewed from the top-and-bottom direction is a rectangle-like shape. Note that "rectangle-like shape" includes a rectangle, a rectangle with chamfered corners, and a rectangle with rounded corners. Hereinafter, the position of the front sensor 105 may be illustrated as a mark for the front and rear of the autonomous traveling device 100.

The loading platform 102 is loaded with loads such as materials. While there may be cases where the size of the load exceeds the size of the loading platform 102 or the body unit 101, a case where the load is within the size of the loading platform 102 will be described as an example for the sake of explanation, unless otherwise noted.

The wheels 103 are provided at two sections on the right and left sides of the body unit 101 as an example, and are rotationally driven by a motor in the body unit 101. The right and left wheels 103 can be driven independently, and the autonomous traveling device 100 can move forward, backward, rotate on the spot, and turn (so-called curving movement) by driving the right and left wheels 103.

The casters 104 are each provided at the four corners of the body unit 101, for example, to support the body unit 101 so as not to tilt. The casters 104 have no driving force, which roll in accordance with the movement of the body unit 101 and change the directions in accordance with the movement of the body unit 101.

The front sensor 105 detects obstacles and the like over a wide range in front of and the right and left sides of the body unit 101. For example, a 2D-LiDER is used as the front sensor 105.

The rear sensor 106 detects obstacles and the like behind the body unit 101. For example, an infrared sensor or the like is used as the rear sensor 106. The rear sensor 106 may include a plurality of sensor elements, and detection is performed by the sensor elements installed along the rear outer face of the body unit 101, for example.

Figure 4:
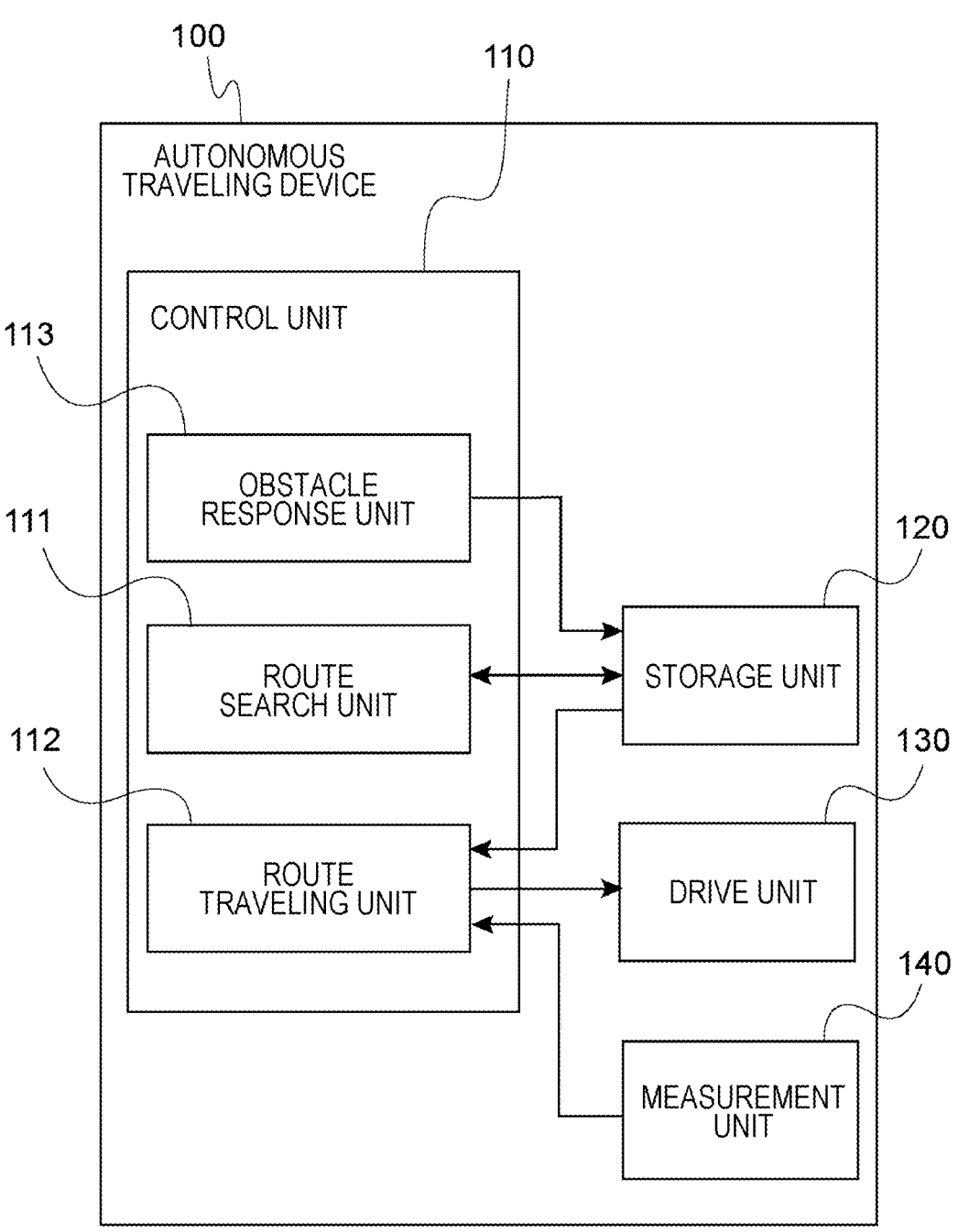
FIG. 4 is a functional block diagram illustrating a functional configuration of the autonomous traveling device according to the present embodiment.

FIG. 4 is a functional block diagram illustrating the functional configuration of the autonomous traveling device 100 according to the present embodiment.

The autonomous traveling device 100 includes a control unit 110, a storage unit 120, a drive unit 130, and a measurement unit 140.

The control unit 110 is a function carried out by a computer built into the body unit 101, which controls the entire autonomous traveling device 100.

The storage unit 120 stores map information of the regions where the autonomous traveling device 100 travels and the routes to be traveled in the regions.

The drive unit 130 is a function carried out by the power supply and motor built into the body unit 101 as well as the wheels 103 described above. The autonomous traveling device 100 travels when the drive unit 130 drives under the control of the control unit 110.

The measurement unit 140 is a function carried out by the above-described front sensor 105 and rear sensor 106, and measures obstacles and the like.

The control unit 110 includes a route search unit 111, a route traveling unit 112, and an obstacle response unit 113.

The route search unit 111 searches for and determines a route to the destination based on the map information stored in the storage unit 120, and stores the determined route in the storage unit 120. In the present embodiment, the route search unit 111 searches for routes that can reach the destination while avoiding obstacles indicated in the map information as a route, and determines the route that reaches the destination in the shortest time.

The route traveling unit 112 controls the drive unit 130 such that the autonomous traveling device 100 travels along the route stored in the storage unit 120. In the present embodiment, the route traveling unit 112 also performs control to avoid the obstacle measured by the measurement unit 140.

The obstacle response unit 113 modifies the map information stored in the storage unit 120 to avoid getting stuck, when the obstacle measured by the measurement unit 140 is located at a prescribed short distance. The details of modification of the map information performed by the obstacle response unit 113 will be described later.

Figure 5:
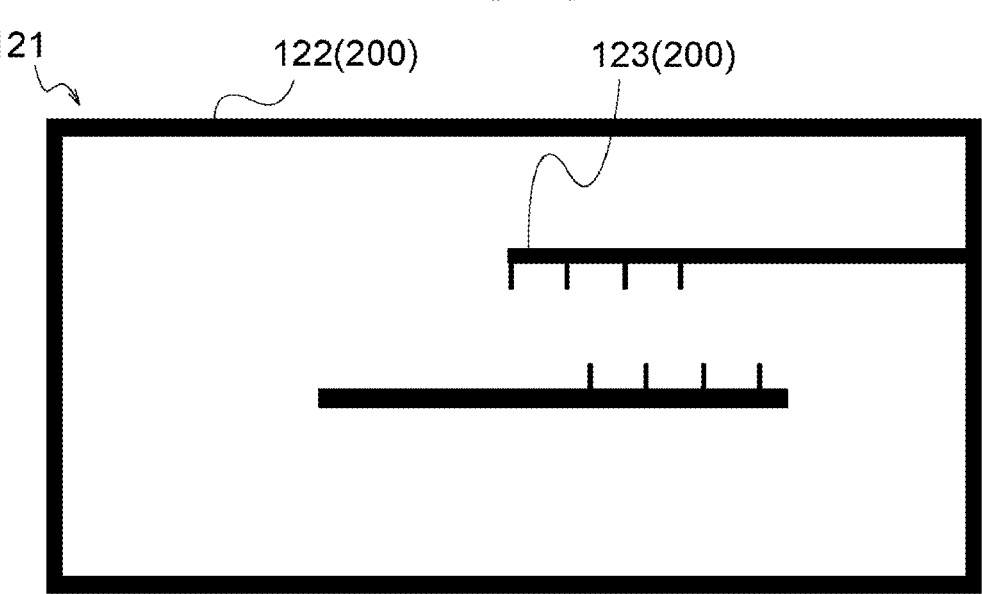
FIG. 5 is a diagram illustrating an example of map information.
Figure 6:
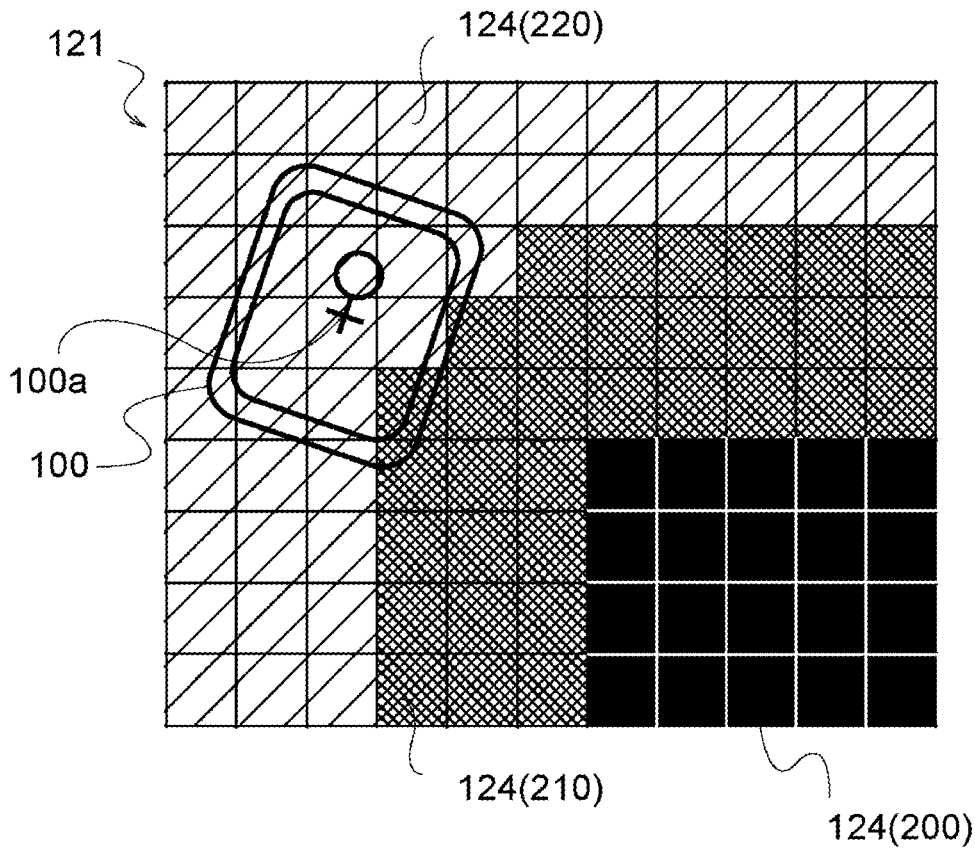
FIG. 6 is a diagram illustrating details of the map information.

FIG. 5 is a diagram illustrating an example of the map information, and FIG. 6 is a diagram illustrating the details of the map information.

Map information 121 provides information of walls 122 and shelves 123. The walls 122 and the shelves 123 are objects that are obstacles to traveling of the autonomous traveling device 100, and the walls 122 and the shelves 123 are collectively referred to as obstacles 200 hereinafter.

As illustrated in FIG. 6, the map information 121 represents a map as a set of unit parcels 124 that are the traveling area of the autonomous traveling device 100 sectioned into a grid pattern. A cost of "100", for example, is assigned to the unit parcels 124 of the obstacle 200 as information indicating to be the obstacle 200, and a cost of less than 100 is assigned to each of the other unit parcels 124. The cost for each of the unit parcels 124 is assigned according to the distance from the obstacle 200, for example.

Figure 7:
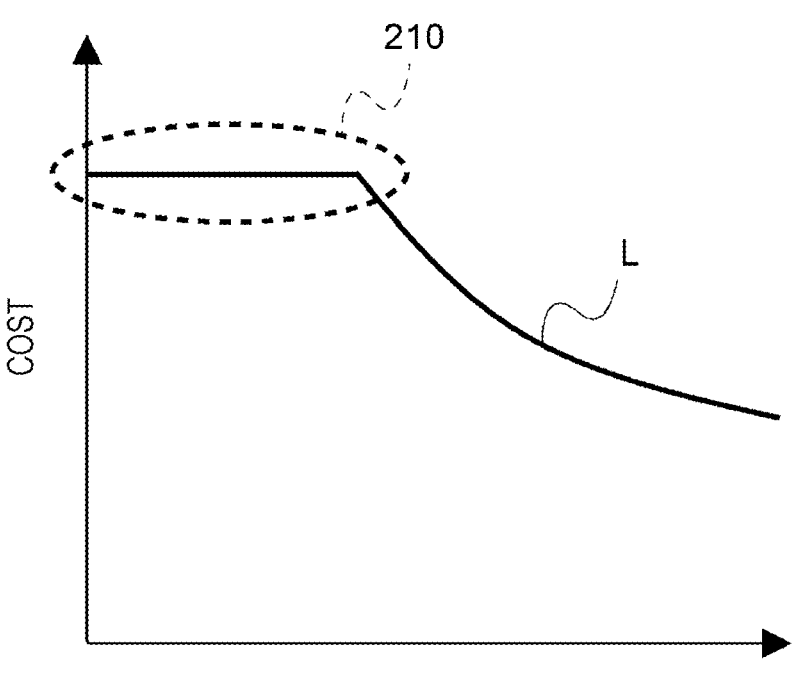
FIG. 7 is a graph indicating examples of cost assigned to unit parcels other than an obstacle.

FIG. 7 is a graph indicating examples of the cost assigned to the unit parcels 124 other than the obstacle 200.

The horizontal axis of the graph in FIG. 7 represents the distance from the unit parcel 124 to the nearest obstacle 200, and the vertical axis represents the cost to be assigned.

The cost to be assigned to each of the unit parcels 124 is represented by a graph line L that is, for example, sloping downward and rightward, and convex downward. The graph line L is also a straight line parallel to the horizontal axis in a place where the distance to the obstacle 200 is short. In other words, the highest cost is assigned to the unit parcel 124 whose distance is shorter than a prescribed distance. The unit parcels 124 where the highest cost is assigned are distributed in the surroundings of the obstacle 200 as illustrated in FIG. 6, which forms a travel prohibited area 210 that is excluded from the route search because the cost is too high. The unit parcel 124 that is farther away from the obstacle 200 and is assigned a cost lower than the highest cost is a travelable area 220 that can be part of the travel route.

The width of the travel prohibited area 210 (that is, the length of the straight line part of the graph line L parallel to the horizontal axis) is determined arbitrarily based on the car body size and the like of the autonomous traveling device 100. The width of the travel prohibited area 210 may also be determined based on the breadth of the autonomous traveling device 100, for example.

The route search unit 111 described above searches for travel routes within the travelable area 220, and determines the travel route with a shorter travel length.

Figure 8:
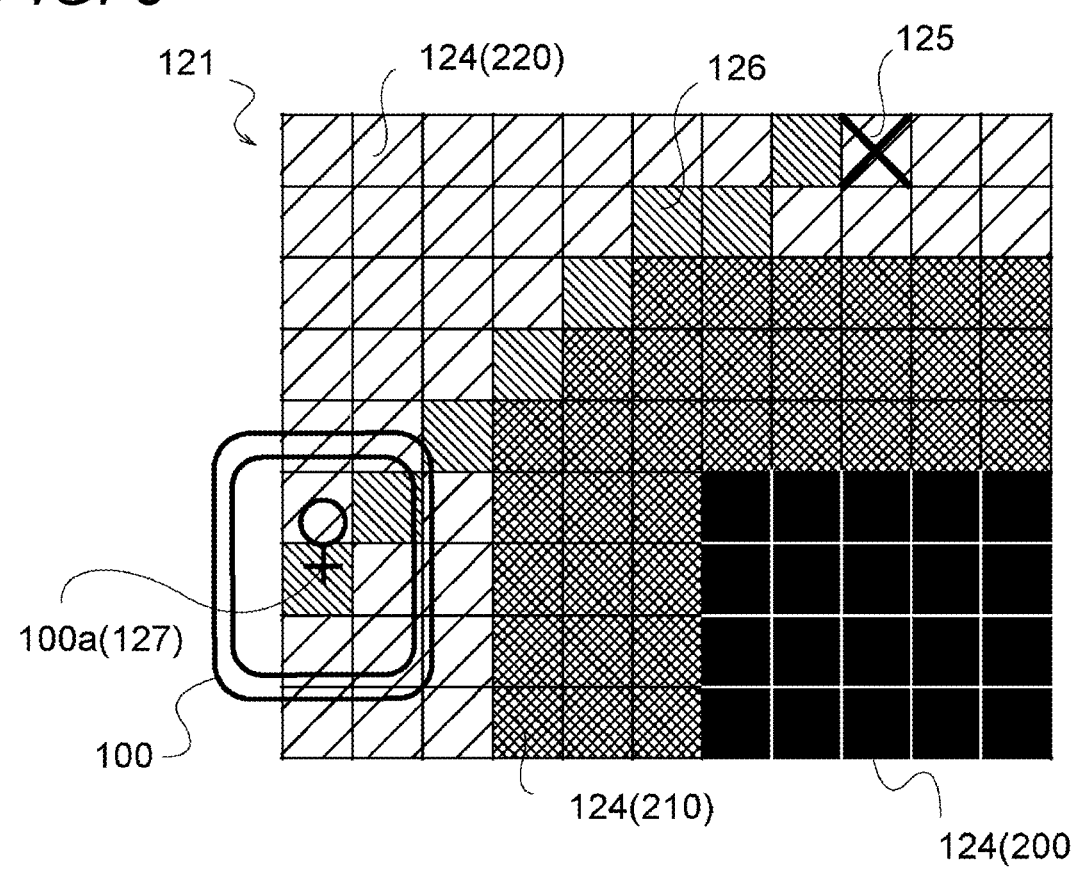
FIG. 8 is a diagram illustrating an example of a travel route.

FIG. 8 is a diagram illustrating an example of a travel route.

The route search unit 111 searches for, within the travelable area 220, a trajectory in which a car body center 100a moves on a travel route 126 that is from a starting point 127 that is the unit parcel 124 where the car body center 100a of the autonomous traveling device 100 is located on the map information 121 to a given destination 125 (for example, destination for transporting materials and the like). The route search unit 111 also searches for and determines the travel route 126 such that the total cost assigned to each of the unit parcels 124 on the travel route 126 becomes small. In other words, as the travel route 126, the route search unit 111 searches for a route with which the total cost becomes small.

As a result, the travel route 126 with a short travel distance is searched and determined. Furthermore, because the travel prohibited area 210 is provided in the surroundings of the obstacle 200, the travel route 126 passes through by avoiding the travel prohibited area 210, and the autonomous traveling device 100 travels while keeping the car body center 100a at a prescribed distance or more from the obstacle 200.

Even while the autonomous traveling device 100 is traveling along the travel route 126, the route search unit 111 according to the present embodiment searches for and determines a new travel route 126 and travels by continuing to update the travel route 126.

Figure 9:
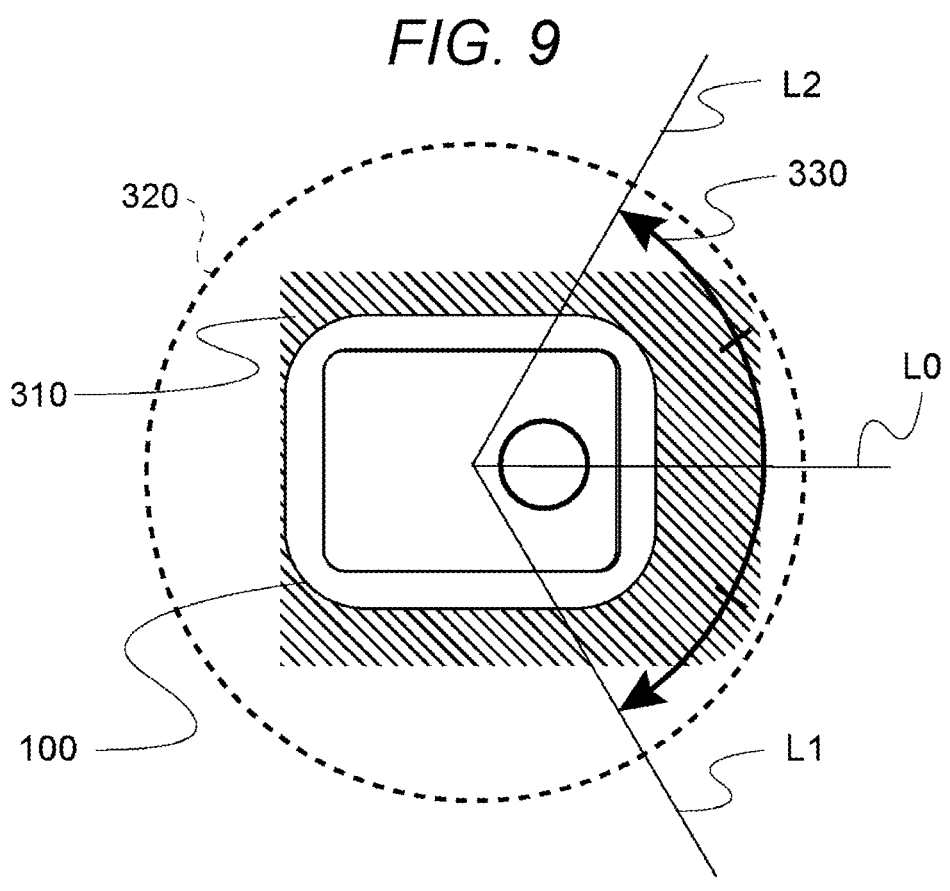
FIG. 9 is a diagram for describing details of travel control performed in the autonomous traveling device.

FIG. 9 is a diagram for describing details of travel control performed in the autonomous traveling device 100.

The autonomous traveling device 100 has a stop area 310 in the surroundings of the device to avoid contact with the obstacle 200 during autonomous traveling, and the autonomous traveling device 100 stops traveling when the obstacle 200 is detected in the stop area 310. When the autonomous traveling device 100 stops traveling, the autonomous traveling device 100 executes recovery to move away from the obstacle 200 and resume autonomous traveling. When the autonomous traveling device 100 is unable to move away sufficiently from the obstacle 200 even after recovery is executed, it falls into a stuck state where autonomous traveling is not possible.

As described above, as the movement, the autonomous traveling device 100 can move forward, backward, rotate on the spot, and turn. However, in the present embodiment, a limit is placed on the circumstances in which rotation on the spot is executed. Rotation of the autonomous traveling device 100 on the spot is executed when the direction of the determined travel route 126 is far away from the direction of the autonomous traveling device 100. More precisely, when the travel route 126 is heading in a direction beyond one of limit lines L1 and L2 that are open at a prescribed angle to the right and left with respect to a center line L0 of the autonomous traveling device 100, the autonomous traveling device 100 rotates on the spot to face the direction of the travel route 126. Conversely, when the direction of the travel route 126 is a direction within a prohibited range 330 sandwiched between the right and left limit lines L1 and L2, the autonomous traveling device 100 is prohibited from rotating on the spot. When the direction of the travel route 126 is a direction within the prohibited range 330 and different from the center line L0, the autonomous traveling device 100 heads in the direction of the travel route 126 by a turning movement.

That is, the autonomous traveling device 100 rotates on the spot only when the direction of the device (the direction of the center line L0) and the direction of the travel route 126 are separated by more than a prescribed degree (for example, beyond the directions of the limit lines L1 and L2).

The autonomous traveling device 100 according to the present embodiment is required to travel in the area including a narrow path that is so narrow that 360-degree rotation on the spot is not possible and the vicinity of the obstacle 200. If the autonomous traveling device 100 is to execute rotation on the spot in such a narrow path and in the vicinity of the obstacle 200, the stop area 310 comes to overlap with the obstacle 200 and the autonomous traveling device 100 stops.

Figure 10:
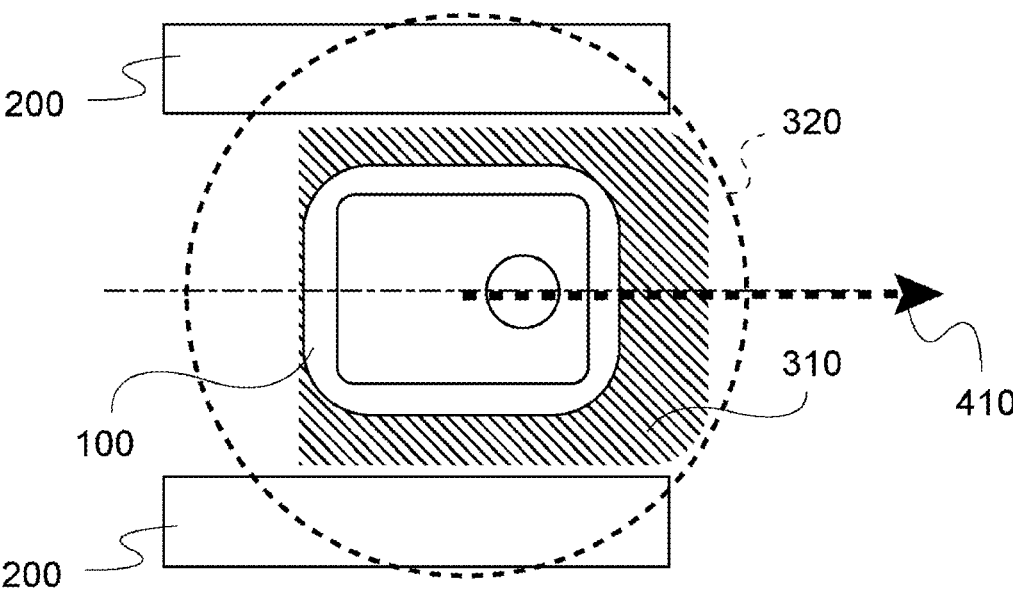
FIG. 10 is a diagram illustrating a state where the autonomous traveling device travels on a narrow path.

FIG. 10 is a diagram illustrating a state where the autonomous traveling device 100 travels on a narrow path.

In FIG. 10, a narrow path sandwiched by the obstacles 200 is illustrated. The obstacles 200 sandwiching the narrow path are located at a close distance overlapping with a free rotation circle 320 that is required for the autonomous traveling device 100 to perform 360-degree rotation on the spot. When rotation on the spot or turning is performed in the narrow path, the stop area 310 comes to overlap with the obstacles 200, and the autonomous traveling device 100 stops. By traveling straight along a straight route 410, the autonomous traveling device 100 can travel through the narrow path without getting stuck.

Figure 11:
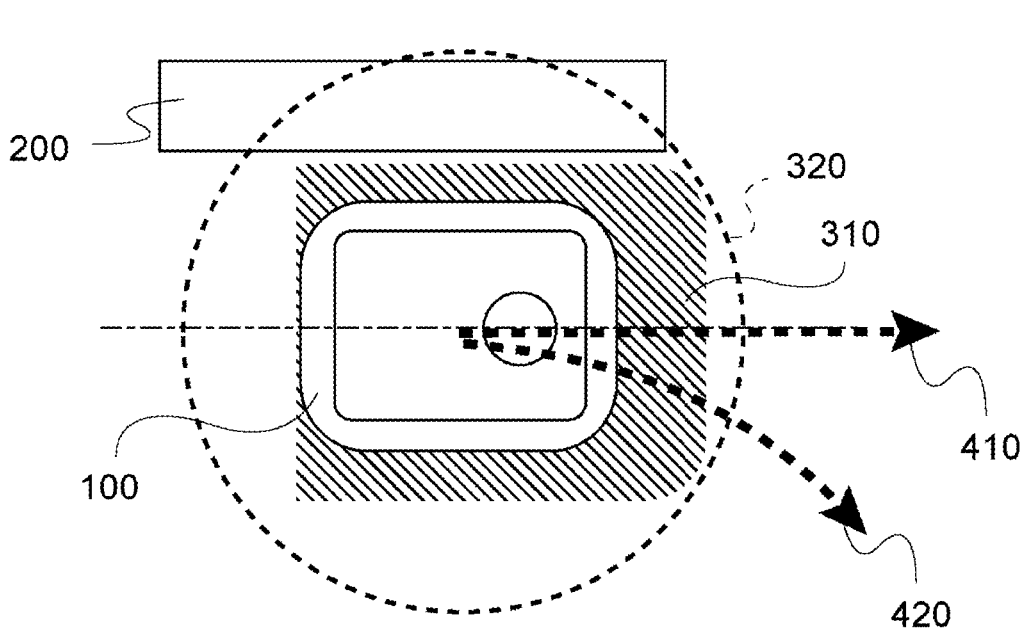
FIG. 11 is a diagram illustrating a state where the autonomous traveling device travels in the vicinity of an obstacle with the obstacle on the left side.

FIG. 11 is a diagram illustrating a state where the autonomous traveling device 100 travels in the vicinity of the obstacle 200 with the obstacle 200 on the left side.

FIG. 11 illustrates the vicinity of the obstacle 200, in which the obstacle 200 is located on the left side of the autonomous traveling device 100 at a short distance overlapping with the free rotation circle 320. When rotation on the spot is performed in the vicinity of the obstacle 200 illustrated in FIG. 11, the stop area 310 comes to overlap with the obstacle 200, and the autonomous traveling device 100 stops. By traveling straight along the straight route 410 or turning to the right front side along a turning route 420, the autonomous traveling device 100 can travel through the vicinity of the obstacle 200 without getting stuck.

Figure 12:
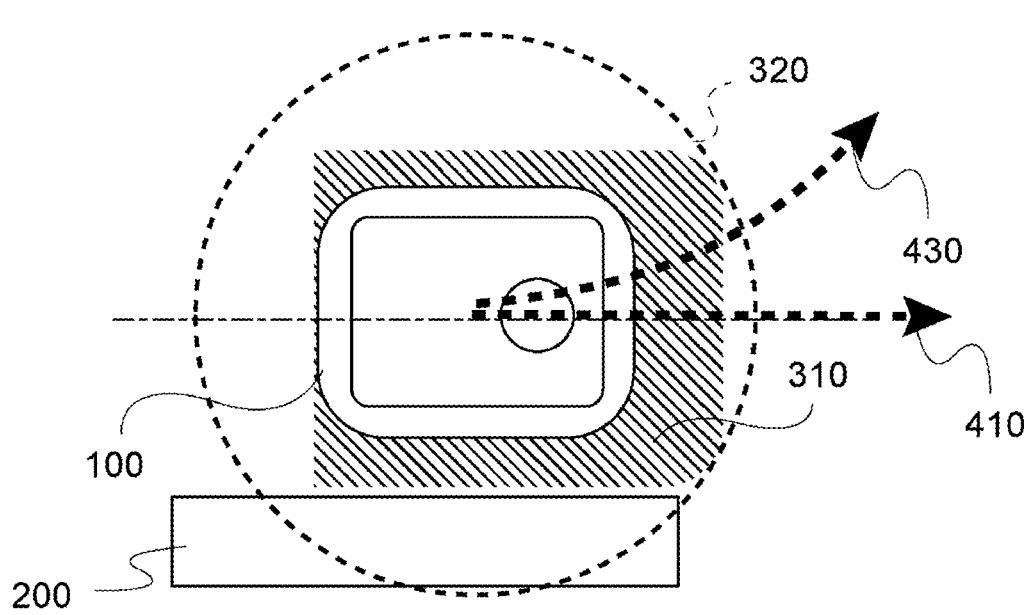
FIG. 12 is a diagram illustrating a state where the autonomous traveling device travels in the vicinity of the obstacle with the obstacle on the right side.

FIG. 12 is a diagram illustrating a state where the autonomous traveling device 100 travels in the vicinity of the obstacle 200 with the obstacle 200 on the right side.

FIG. 12 illustrates the vicinity of the obstacle 200, in which the obstacle 200 is located on the right side of the autonomous traveling device 100 at a short distance overlapping with the free rotation circle 320. When rotation on the spot is performed in the vicinity of the obstacle 200 illustrated in FIG. 12, the stop area 310 comes to overlap with the obstacle 200, and the autonomous traveling device 100 stops. By traveling straight along the straight route 410 or turning to the left front side along a turning route 430, the autonomous traveling device 100 can travel through the vicinity of the obstacle 200 without getting stuck.

Figure 13:
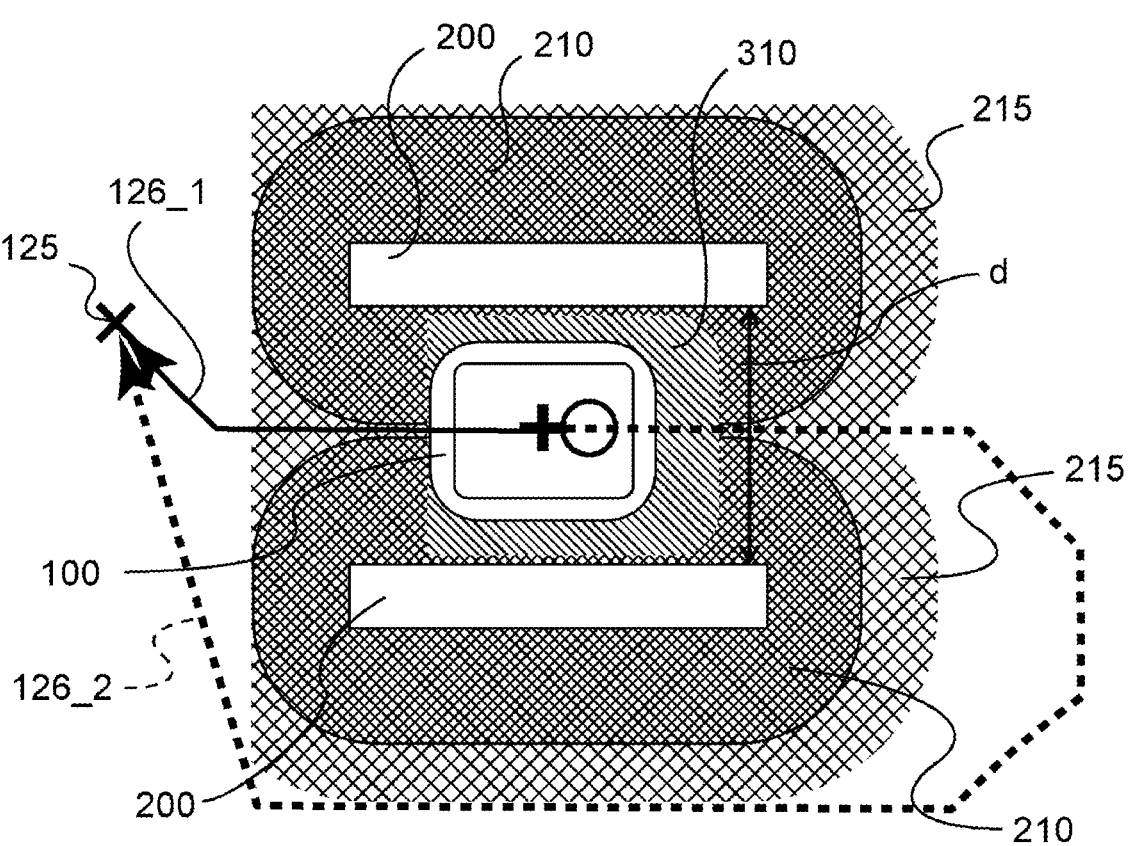
FIG. 13 is a diagram illustrating an example of a travel route that is searched while traveling on a narrow path.

FIG. 13 is a diagram illustrating an example of a travel route that is searched while traveling on a narrow path.

FIG. 13 illustrates a narrow path with a width d sandwiched by the obstacles 200. The width d of the narrow path is slightly greater than the width of the stop area 310 of the autonomous traveling device 100. As described above, the travel prohibited area 210 is distributed around the obstacles 200. Furthermore, around the travel prohibited area 210, a medium-cost area 215, to which a cost that is lower than the highest cost assigned to the travel prohibited area 210 but higher than other parts of the travelable area 220, is distributed.

Since the width of the travel prohibited area 210 distributed around the obstacles 200 is less than half the width of the stop area 310 as an example, the medium-cost area 215 that the travel prohibited area 210 does not reach and the autonomous traveling device 100 can travel remains in the center of the narrow path. Therefore, when searching for the route by the route search unit 111, travel routes 126_1 and 126_2 passing through the narrow path are also the search target.

Here, when the autonomous traveling device 100 faces the right direction of the drawing and the destination 125 is located on the left side of the drawing, the travel route 126_1 that reaches the destination 125 by heading toward the left side on the narrow path is shorter and has less total cost compared to the travel route 126_2 that reaches the destination 125 by heading toward the right side on the narrow path. Therefore, if the map information is not modified by the obstacle response unit 113, the travel route 126_1 to the left side is determined with priority, and the autonomous traveling device 100 starts to rotate on the spot so as to head toward the left side. As a result, the stop area 310 comes to overlap with the obstacle 200, and the autonomous traveling device 100 stops.

The obstacle response unit 113 modifies the map information as will be described below in order to exclude the travel route 126_1 illustrated in FIG. 13, which reaches the destination 125 by heading toward the left side on the narrow path.

Figure 14:
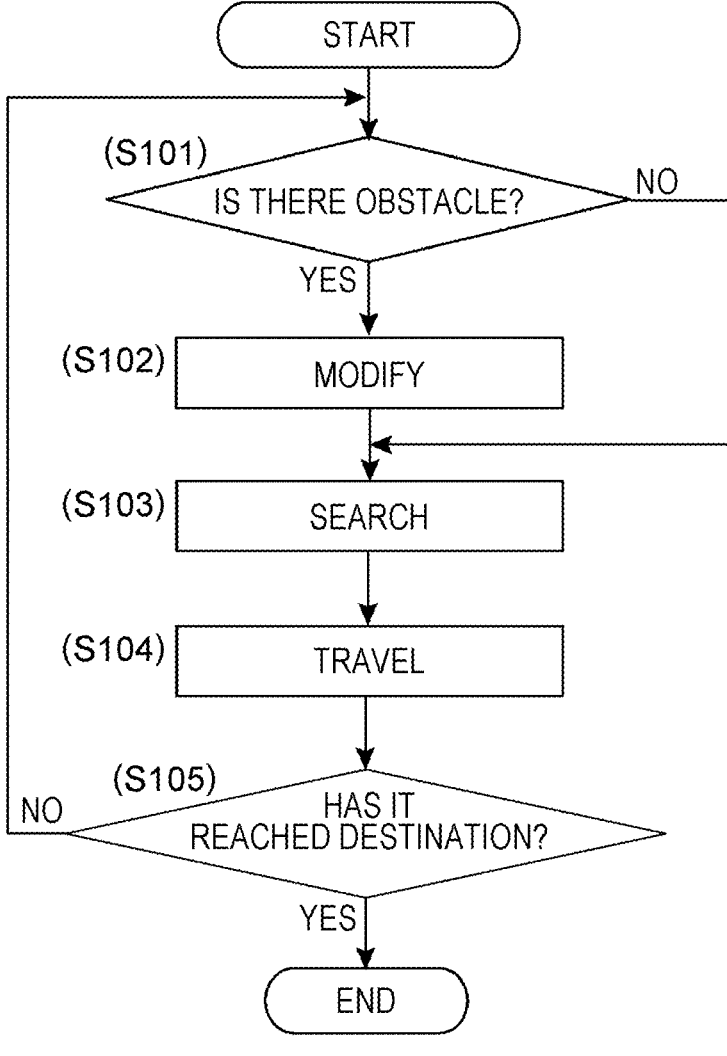
FIG. 14 is a flowchart illustrating control processing when the autonomous traveling device travels.

FIG. 14 is a flowchart illustrating control processing when the autonomous traveling device 100 travels.

The autonomous traveling device 100 first performs measurement of the obstacle 200 by controlling the measurement unit 140 with the route traveling unit 112 at step S101. In the present embodiment, the route traveling unit 112 corresponds to an example of a check unit, and checks whether the obstacle 200 exists at a short distance where rotation on the spot is not possible. When the obstacle 200 exists at a close distance overlapping with the free rotation circle 320 (YES at step S101), the autonomous traveling device 100 modifies the map information 121 by the obstacle response unit 113 at step S102. Step S102 corresponds to an example of an information adding step in the present invention.

Figure 15:
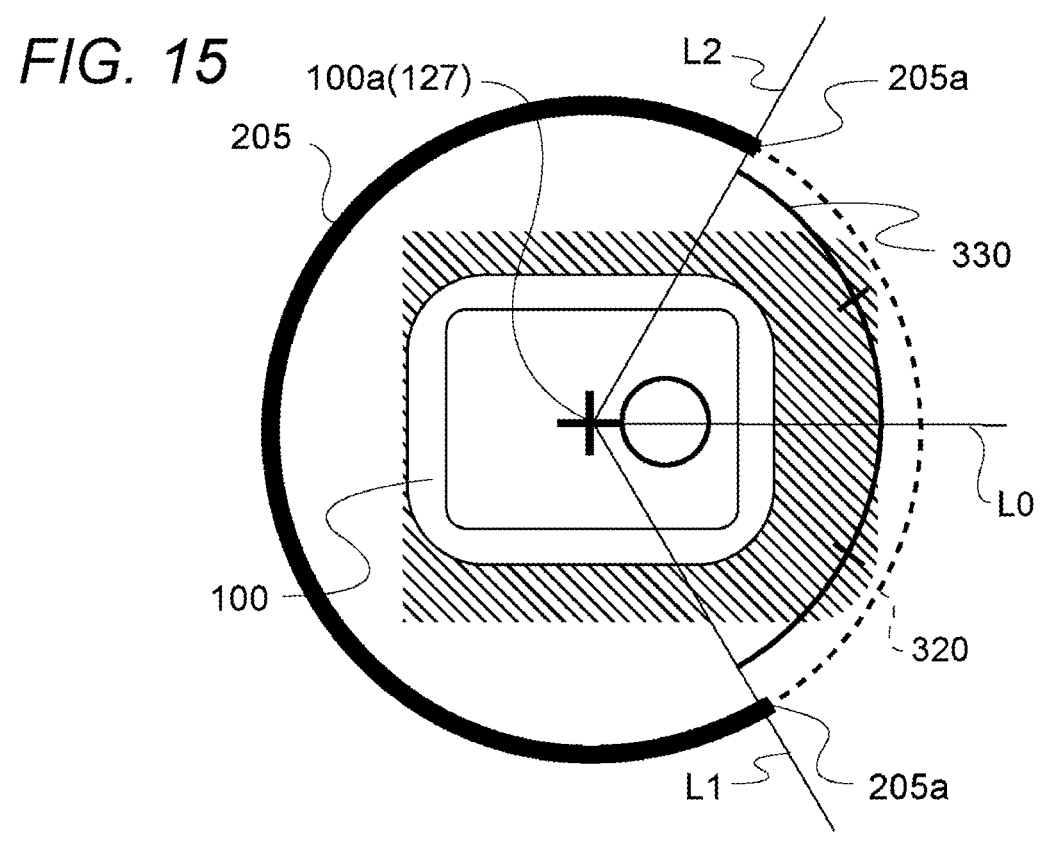
FIG. 15 is a diagram illustrating modification contents of the map information performed by an obstacle response unit.

FIG. 15 is a diagram illustrating modification contents of the map information 121 performed by the obstacle response unit 113.

The obstacle response unit 113 performs modification to add an arc-shaped virtual obstacle 205 to the map information 121. In other words, in the present embodiment, the virtual obstacle 205 extends in an arc shape. Shapes other than the arc shape may also be used for the shape of the virtual obstacle in the present invention. However, the virtual obstacle 205 in an arc shape is preferable since the virtual obstacle 205 can reliably block the travel route heading right behind the autonomous traveling device 100, even when the obstacle 200 is in any direction in the surroundings of the autonomous traveling device 100. The virtual obstacle 205 in an arc shape is also easy to calculate the position.

The addition of the virtual obstacle 205 to the map information 121 is achieved by assigning the highest cost described in FIG. 7 to the position of the virtual obstacle 205.

The virtual obstacle 205 extends along the free rotation circle 320 by surrounding the starting point 127 that is the car body center 100a. The virtual obstacle 205 passes continuously on the rear side of the autonomous traveling device 100, and reaches the front side of the autonomous traveling device 100 by passing the right and left sides of the autonomous traveling device 100.

In other words, the obstacle response unit 113 corresponds to an example of an information adding unit in the present invention, and adds, as positional information of the virtual obstacle 205, to the map information 121, the positional information of the virtual obstacle 205 that continuously extends to the front side on both the right and left sides of the device through the rear side of the device with respect to the starting point 127 of the travel route 126.

In further detail, the virtual obstacle 205 opens only within the prohibited range 330 on the front side of the autonomous traveling device 100. The virtual obstacle 205 may be opened narrower than the prohibited range 330. That is, both opening ends 205a of the virtual obstacle 205 reach within the prohibited range 330 sandwiched between the right and left limit lines L1 and L2. In other words, each of the ends 205a extending to the front side of the virtual obstacle 205 is located in directions away from the frontward direction (in the direction of the center line L0) of the device within a prescribed degree (within the prohibited range 330). When the opening ends 205a reach within the prohibited range 330, the travel route in the direction of performing rotation on the spot is reliably excluded from the search. Conversely, within the range where rotation on the spot can be avoided, there is flexibility in the search for the travel route.

The autonomous traveling device 100 that has modified the map information 121 by adding the virtual obstacle 205 at step S102 of FIG. 14 searches for a travel route by the route search unit 111 based on the modified map information 121 at step S103. In other words, the route search unit 111 searches for the travel route 126 based on the map information 121 to which the positional information of the virtual obstacle 205 is added.

Step S103 corresponds to an example of a route search step in the present invention.

Figure 16:
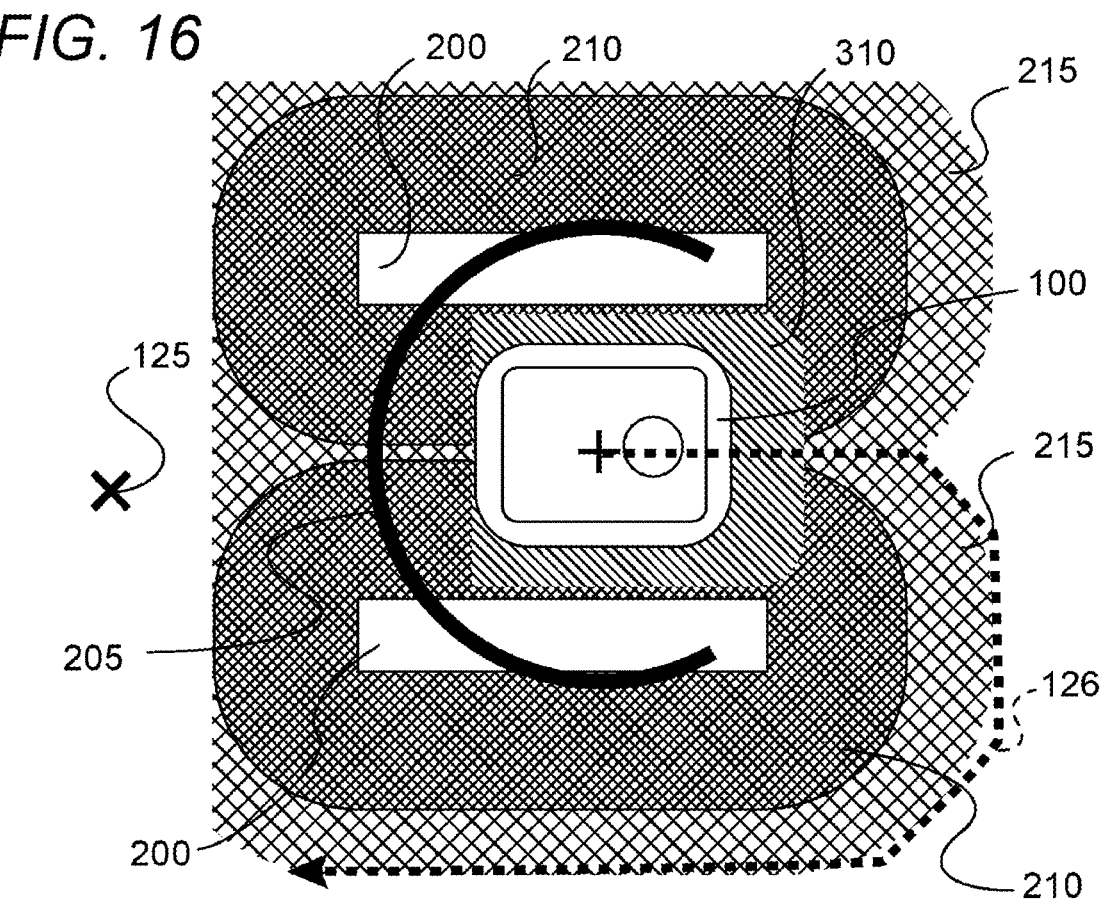
FIG. 16 is a diagram illustrating a result of route search in a narrow path.

FIG. 16 is a diagram illustrating a result of route search in a narrow path.

In the narrow path sandwiched between the obstacles 200, the virtual obstacle 205 added to the map information 121 overlaps with the obstacles 200 on the right and left sides of the autonomous traveling device 100. Thus, the travel route heading toward the rear side of the autonomous traveling device 100 is excluded from the search. Furthermore, due to the travel prohibited area 210 distributed around the obstacle 200, the travel route where the autonomous traveling device 100 turns to the right and left sides is also excluded from the search.

As a result, even when the destination 125 is located on the rear side of the autonomous traveling device 100, the travel route 126 that goes straight to the front side of the autonomous traveling device 100 to pass through the narrow path is searched and determined as the travel route 126.

When the travel route 126 as illustrated in FIG. 16 is searched and determined at step S103 of FIG. 14, the autonomous traveling device 100, at step S104, performs autonomous traveling along the determined travel route 126 by controlling the drive unit 130 by the route traveling unit 112. By following the travel route 126 illustrated in FIG. 16, the autonomous traveling device 100 can go straight through the narrow path without the stop area 310 overlapping with the obstacles 200 on the right and left sides, thereby making it possible to avoid getting stuck.

The processing from step S101 to step S104 of FIG. 14 is repeatedly executed until the autonomous traveling device 100 reaches the destination 125 (NO at step S105), and the route search unit 111 searches for a new travel route 126 based on the map information 121 while traveling along the travel route 126. This allows the search for the travel route 126 to be redone in response to changes in the conditions in the surroundings of the autonomous traveling device 100, and a better travel route 126 is determined. When the autonomous traveling device 100 reaches the destination 125 (YES at step S105), the processing procedure in FIG. 14 is ended.

The virtual obstacle 205 added to the map information 121 at step S102 is once deleted after the route search performed at step S103 and, while the obstacle 200 is being located in the vicinity of the autonomous traveling device 100 (YES at step S101), the virtual obstacle 205 updated on the basis of the position and orientation of the autonomous traveling device 100 is repeatedly added to the map information 121 at step S102. That is, the position and orientation of the virtual obstacle 205 changes as the autonomous traveling device 100 moves.

When the autonomous traveling device 100 leaves the narrow path and reaches a position where the obstacle 200 does not overlap with the free rotation circle 320 (that is, the circle formed by extending the virtual obstacle 205) (NO at step S101), route search and autonomous traveling are performed without the virtual obstacle 205 (step S103, step S104).

In other words, the obstacle response unit 113 adds the positional information of the virtual obstacle 205 to the map information 121 when there is the obstacle 200, and excludes the positional information of the virtual obstacle 205 from the map information 121 when there is no obstacle 200. As a result, when the autonomous traveling device 100 reaches a position where rotation on the spot is possible, the virtual obstacle 205 is removed and the travel route 126 comes to be more flexible.

In the example illustrated in FIG. 16, the autonomous traveling device 100 out of the narrow path heads toward the destination 125 by going around the obstacle 200 on a low-cost travel route 126 along the medium-cost area 215.

Figure 17:
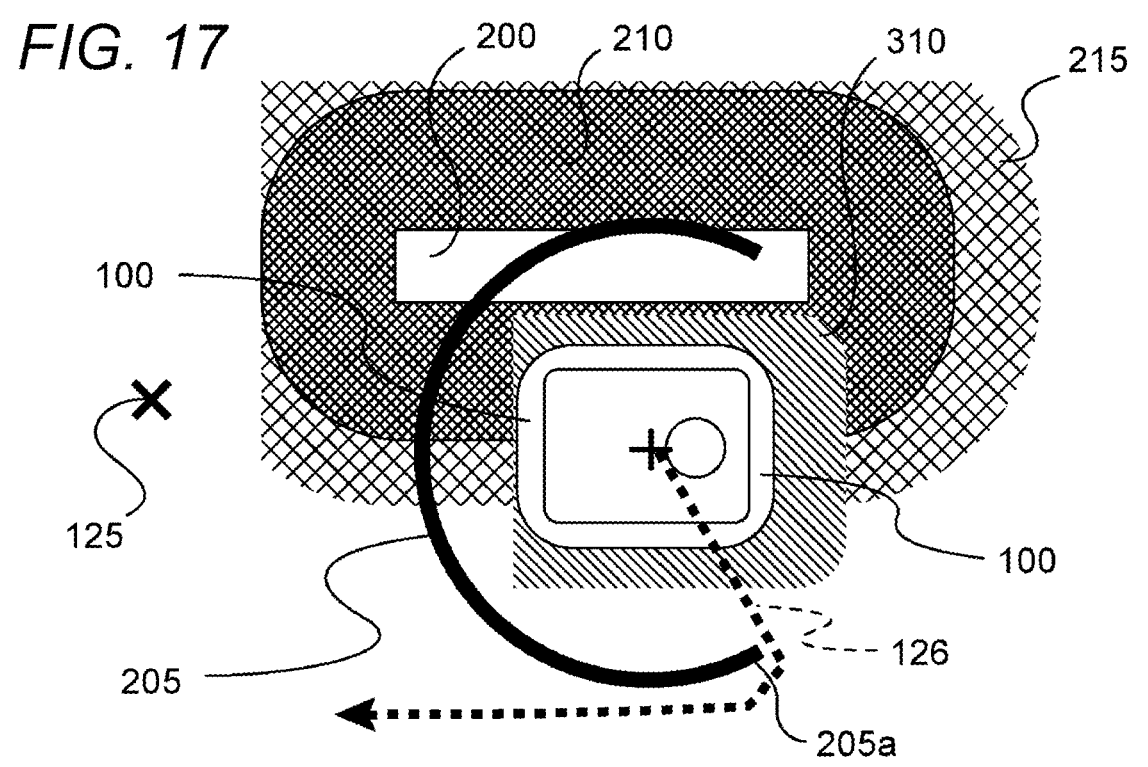
FIG. 17 is a diagram illustrating a result of route search in a case where the autonomous traveling device is located in the vicinity of the obstacle with the obstacle on the left side.

FIG. 17 is a diagram illustrating a result of the route search in a case where the autonomous traveling device 100 is located in the vicinity of the obstacle 200 with the obstacle 200 on the left side.

In the situation illustrated in FIG. 17, it is also determined at step S101 of FIG. 14 that the obstacle 200 exists in the vicinity of the autonomous traveling device 100, and the virtual obstacle 205 is added to the map information 121 at step S102. In the situation illustrated in FIG. 17, the virtual obstacle 205 added to the map information 121 overlaps with the obstacle 200 located on the left side of the autonomous traveling device 100. Thus, the travel route heading toward the rear side of the autonomous traveling device 100 is excluded from the search. Furthermore, due to the travel prohibited area 210 distributed around the obstacle 200, the travel route where the autonomous traveling device 100 turns to the left side is also excluded from the search.

As a result, when the destination 125 is located on the rear side of the autonomous traveling device 100, the travel route 126 that goes around the opening end 205a on the right side of the virtual obstacle 205 from the front side of the autonomous traveling device 100 is searched and determined as the travel route 126. Since the direction of the travel route 126 illustrated in FIG. 17 is within a range of the opening angle of the virtual obstacle 205, the autonomous traveling device 100 is prohibited from rotating on the spot. In other words, the autonomous traveling device 100 turns to the right front side and moves away from the obstacle 200. Thus, it is possible to travel without the stop area 310 overlapping with the obstacle 200, thereby making it possible to avoid getting stuck.

Figure 18:
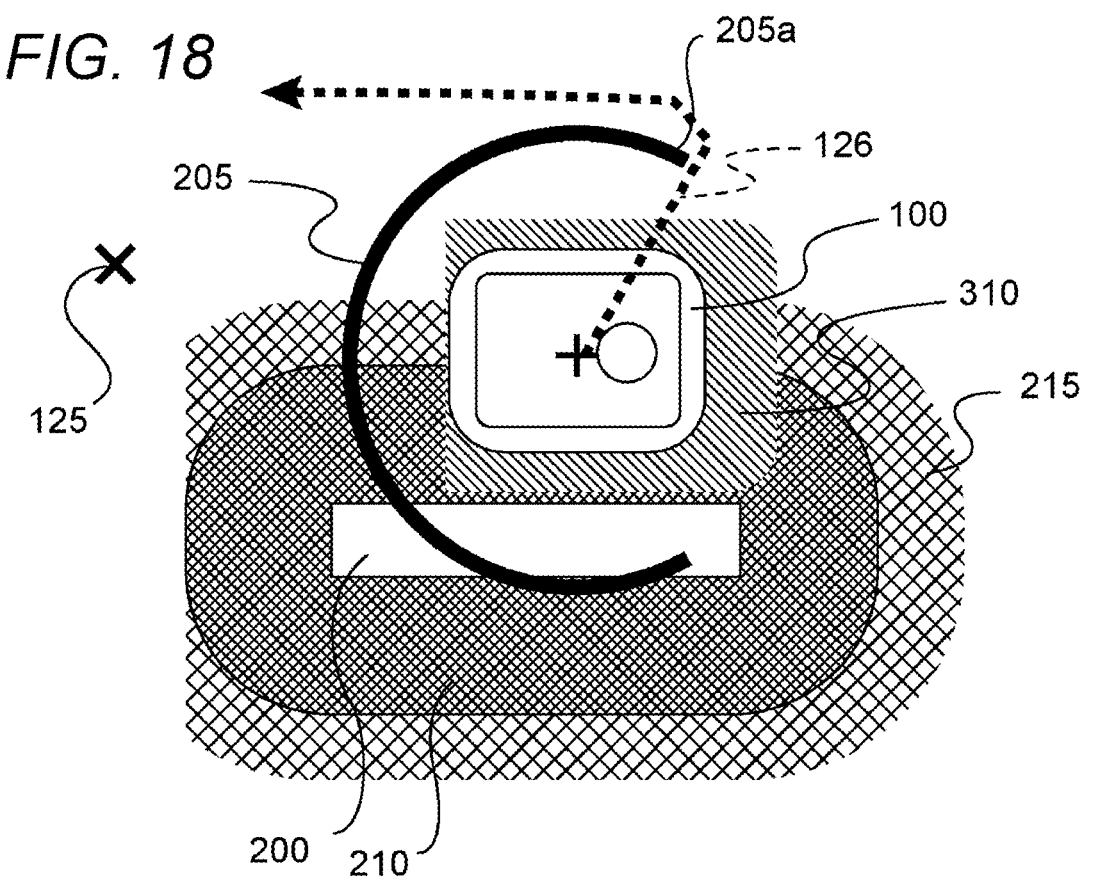
FIG. 18 is a diagram illustrating a result of route search in a case where the autonomous traveling device is located in the vicinity of the obstacle with the obstacle on the right side.

FIG. 18 is a diagram illustrating a result of route search in a case where the autonomous traveling device 100 is located in the vicinity of the obstacle 200 with the obstacle 200 on the right side.

In the situation illustrated in FIG. 18, it is also determined at step S101 of FIG. 14 that the obstacle 200 exists in the vicinity of the autonomous traveling device 100, and the virtual obstacle 205 is added to the map information 121 at step S102. In the situation illustrated in FIG. 18, the virtual obstacle 205 added to the map information 121 overlaps with the obstacle 200 located on the right side of the autonomous traveling device 100. Thus, the travel route heading toward the rear side of the autonomous traveling device 100 is excluded from the search. Furthermore, due to the travel prohibited area 210 distributed around the obstacle 200, the travel route where the autonomous traveling device 100 turns to the right side is also excluded from the search.

As a result, when the destination 125 is located on the rear side of the autonomous traveling device 100, the travel route 126 that goes around the opening end 205a on the left side of the virtual obstacle 205 from the front side of the autonomous traveling device 100 is searched and determined as the travel route 126. Since the direction of the travel route 126 illustrated in FIG. 18 is also within the range of the opening angle of the virtual obstacle 205, the autonomous traveling device 100 is prohibited from rotating on the spot. In other words, the autonomous traveling device 100 turns to the left front side and moves away from the obstacle 200. Thus, it is possible to travel such that the stop area 310 does not overlap with the obstacle 200, thereby making it possible to avoid getting stuck.

Figure 19:
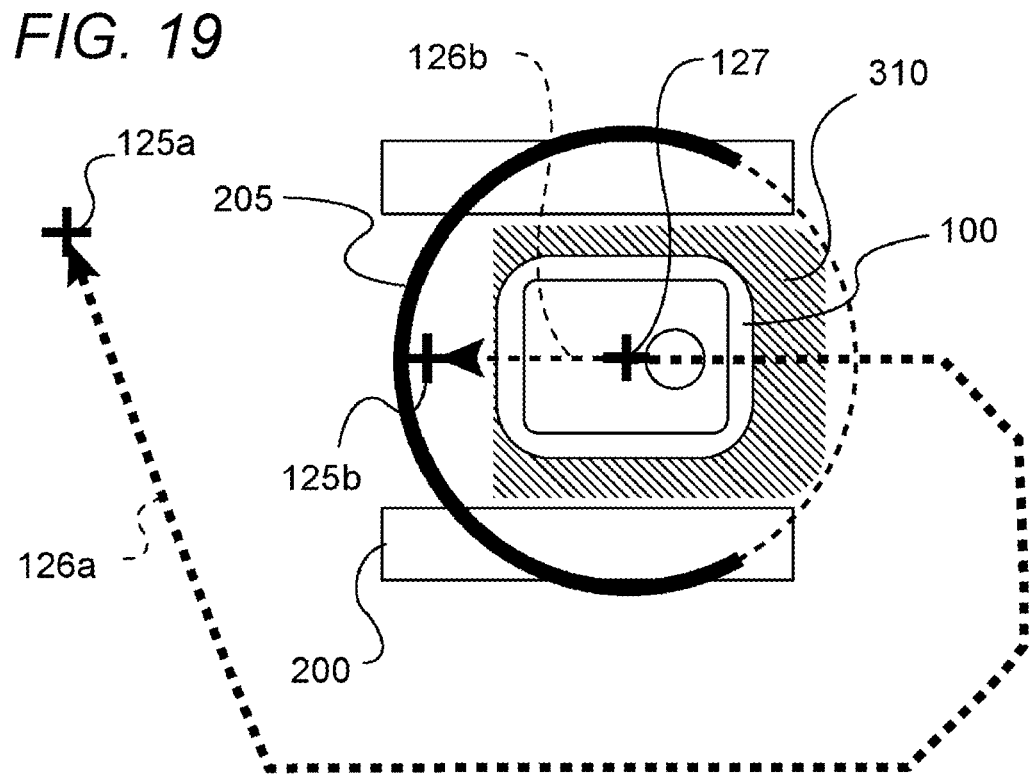
FIG. 19 is a diagram illustrating an exceptional situation in adding processing of the virtual obstacle.

FIG. 19 is a diagram illustrating an exceptional situation in adding processing of the virtual obstacle 205.

FIG. 19 illustrates a destination 125*a* away from the autonomous traveling device 100 and a destination 125*b* in the vicinity of the autonomous traveling device 100. In a case of the destination 125*a* away from the autonomous traveling device 100, a travel route 126*a* heading toward the front side of the autonomous traveling device 100 is searched and determined. In contrast, since the destination 125*b* in the vicinity of the autonomous traveling device 100 is located on the inner side of the virtual obstacle 205, a travel route 126*b* heading toward the rear side of the autonomous traveling device 100 from the starting point 127 to the destination 125*b* is the target of the search, and the autonomous traveling device 100 may rotate on the spot.

Therefore, at step S102 indicated in FIG. 14, exceptional processing to be described below is executed when the destination 125*b* exists in the vicinity of the autonomous traveling device 100.

Figure 20:
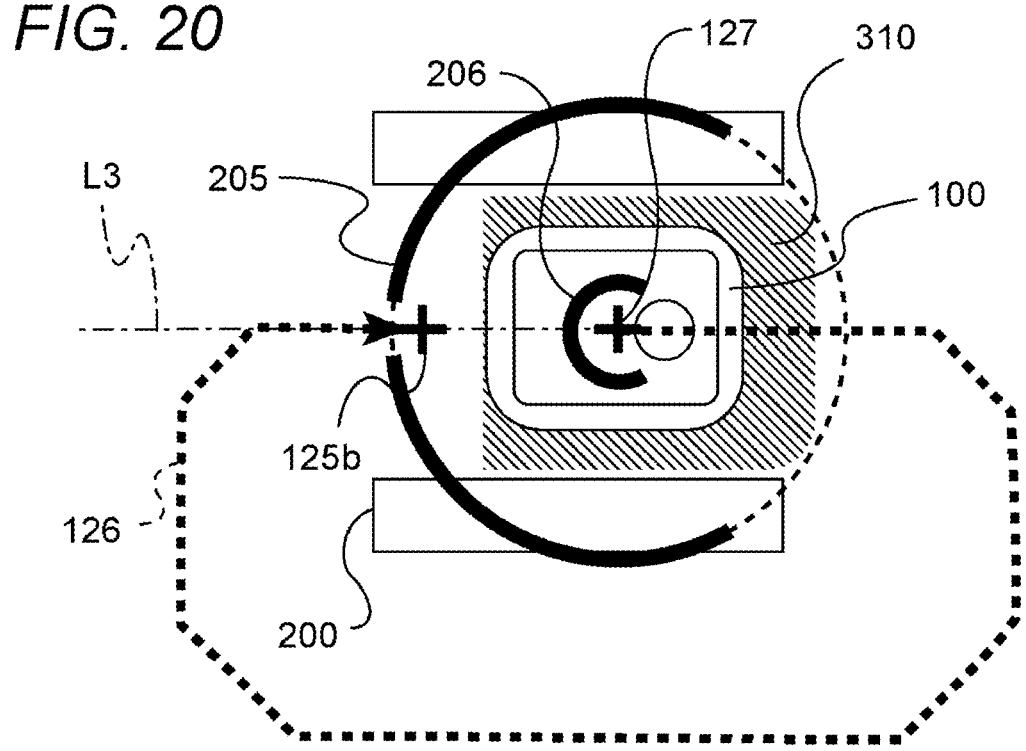
FIG. 20 is a diagram illustrating exceptional processing when adding the virtual obstacle.

FIG. 20 is a diagram illustrating exceptional processing when adding the virtual obstacle 205.

When the destination 125*b* exists in the vicinity of the autonomous traveling device 100, the obstacle response unit 113 adds a small arc-shaped virtual obstacle 206 on the inner side of the virtual obstacle 205. The radius of the small virtual obstacle 206 is smaller than the distance from the starting point 127 to the destination 125*b*. That is, when the destination 125*b* exists on the inner side of the virtual obstacle 205 extending in an arc shape, the obstacle response unit 113 adds, to the map information 121, the positional information of the additional virtual obstacle 206 that extends in an arc shape with a radius shorter than the distance from the starting point 127 to destination 125*b*.

Furthermore, an opening is provided in the larger virtual obstacle 205 for a part of a line L3 heading from the starting point 127 toward the destination 125*b*. Due to such double arc-shaped virtual obstacles 205 and 206, the travel route toward the rear side of the autonomous traveling device 100 is excluded from the search and, as illustrated in FIG. 20, the travel route 126 that goes around the obstacle 200 and heads toward the destination 125*b* is searched and determined.

Figure 21:
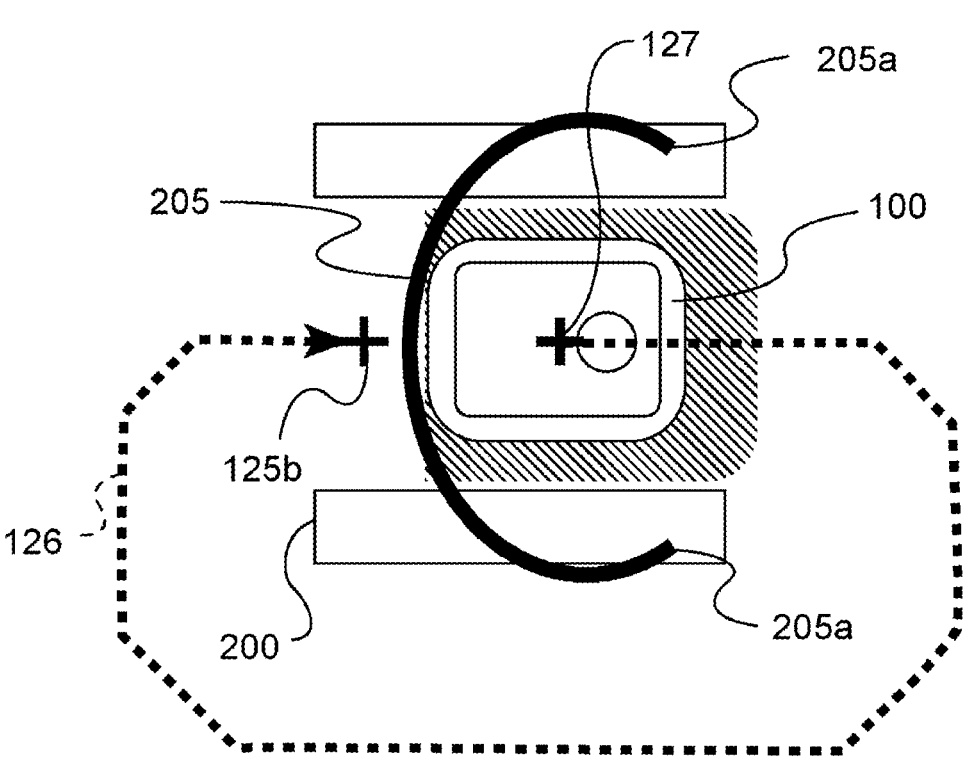
FIG. 21 is a diagram illustrating another example of the exceptional processing when adding the virtual obstacle.

FIG. 21 is a diagram illustrating another example of the exceptional processing when adding the virtual obstacle 205.

In the exceptional processing when adding the virtual obstacle 205, instead of the double arc-shaped virtual obstacles 205, 206, the larger virtual obstacle 205 may be deformed into an elliptical shape, as illustrated in FIG. 21. At the time of deformation, the positions of the opening ends 205*a* are fixed, and the wall of the virtual obstacle 205 located on the rear side of the starting point 127 is deformed until it comes between the destination 125*b* and the starting point 127. Even with such an elliptical virtual obstacle 205, the travel route 126 that goes around the obstacle 200 and heads toward the destination 125*b* is also searched and determined.

While AMR is mentioned herein as an example of application of the autonomous traveling device and the autonomous traveling device control method of the present invention, the application of the autonomous traveling device and the autonomous traveling device control method of the present invention is not limited to the above, and those can be used in a wide range, such as automatic guided vehicles (AGVs) and self-driving vehicles.

It is to be noted that the embodiment described above is to be considered exemplary and not restrictive in all respects. The scope of the present invention is indicated not by the embodiment described above but by the scope of the appended claims, and is intended to include all changes within the meaning and scope of the appended claims and their equivalents.

The invention claimed is:

1. An autonomous traveling device, comprising:

an information adding unit that adds, as positional information of a virtual obstacle, to map information, positional information of a virtual obstacle that passes through a rear side of the autonomous traveling device with respect to a starting point of a travel route and continuously extends to a front side on both right and left sides of the autonomous traveling device; and a route search unit that searches for the travel route based on the map information to which the positional information of the virtual obstacle is added, wherein the autonomous traveling device is configured to autonomously travel along the travel route while keeping a center of the autonomous traveling device at a prescribed distance or more from the virtual obstacle.

2. The autonomous traveling device according to claim 1, wherein the virtual obstacle extends in an arc shape.

3. The autonomous traveling device according to claim 2, wherein, when a destination exists on an inner side of the virtual obstacle extending in an arc shape, the information adding unit adds, to the map information, positional information of an additional virtual obstacle that extends in an arc shape with a radius shorter than a distance from the starting point to the destination.

4. The autonomous traveling device according to claim 1, wherein the autonomous traveling device performs rotation on a spot only when a direction of the autonomous traveling device and a direction of the travel route are separated by more than a prescribed degree, and both ends of the virtual obstacle extending in the front side are each located in directions separate from a frontward direction of the autonomous traveling device within the prescribed degree.

5. The autonomous traveling device according to claim 1, further comprising:

a check unit that checks whether an obstacle exists at a close distance where rotation on a spot is not possible, wherein the information adding unit:

adds the positional information of the virtual obstacle to the map information when the obstacle exists; and excludes the positional information of the virtual obstacle from the map information when the obstacle does not exist.

6. The autonomous traveling device according to claim 1, wherein, while traveling along the travel route, the route search unit searches for a new travel route based on the map information.

7. An autonomous traveling device control method, comprising:

an information adding step of adding, as positional information of a virtual obstacle, to map information, positional information of a virtual obstacle that passes through a rear side of the autonomous traveling device with respect to a starting point of a travel route and continuously extends to a front side on both right and left sides of the autonomous traveling device; and

a route search step of searching for the travel route based on the map information to which the positional information of the virtual obstacle is added, wherein the autonomous traveling device is configured to autonomously travel along the travel route while keeping a center of the autonomous traveling device at a prescribed distance or more from the virtual obstacle.

\* \* \* \* \*